United States Patent [19]
Drefahl

[11] Patent Number: 5,097,720
[45] Date of Patent: Mar. 24, 1992

[54] STEERING WHEEL SKELETON

[75] Inventor: Klaus Drefahl, Hanau, Fed. Rep. of Germany

[73] Assignee: Kolbenschmidt Aktiengesellschaft, Neckarsulm, Fed. Rep. of Germany

[21] Appl. No.: 565,762

[22] Filed: Aug. 10, 1990

[30] Foreign Application Priority Data

Aug. 11, 1989 [DE] Fed. Rep. of Germany ....... 3926576

[51] Int. Cl.⁵ .............................................. B62D 1/04
[52] U.S. Cl. .................................................... 74/552
[58] Field of Search ................. 74/552; 280/750, 777, 280/778, 731; 29/159 B

[56] References Cited

U.S. PATENT DOCUMENTS

| 4,118,455 | 10/1978 | Byrn | 74/552 |
| 4,631,976 | 12/1986 | Noda et al. | 74/552 |
| 4,741,223 | 5/1988 | Kondo et al. | 74/552 |
| 4,892,006 | 1/1990 | Endo et al. | 29/159 B |
| 4,920,821 | 5/1990 | Shinto et al. | 74/552 |
| 4,920,822 | 5/1990 | Abiko | 74/522 |

FOREIGN PATENT DOCUMENTS

| 0262355 | 4/1988 | European Pat. Off. | 74/552 |
| 0292038 | 11/1988 | European Pat. Off. | 74/552 |
| 454581 | 2/1950 | Italy | 74/552 |
| 0063573 | 4/1983 | Japan | 74/552 |
| 0057066 | 4/1984 | Japan | 74/552 |
| 2-15666 | 8/1989 | Japan | 74/552 |

Primary Examiner—Vinh T. Luong
Attorney, Agent, or Firm—Sprung Horn Kramer & Woods

[57] ABSTRACT

In order to have a sufficiently large elongation at fracture in conjunction with high strength values, a pressure-diecast steering wheel skeleton consists of an aluminum alloy which is composed of

| 2.5 to 3.5 | % by weight magnesium |
| 0.10 to 0.30 | % by weight silicon |
| 0.40 to 0.60 | % by weight iron |
| 0.25 to 0.45 | % by weight manganese |
| 0.015 to 0.05 | % by weight copper |
| 0.035 to 0.085 | % by weight zinc |
| balance | aluminum. |

6 Claims, 3 Drawing Sheets

STEERING WHEEL SKELETON

FIELD OF THE INVENTION

This invention relates to a steering wheel skeleton in which at least the hub and the spokes of the steering wheel have integrally been made by pressure diecasting from an aluminum alloy of the type AlMg.

Owing to their relatively high active driving safety and ride comfort, modern motor vehicles provide such an overall comfort that even the slightest disturbance in the general level of vibration will be regarded as disturbing by the driver of the motor vehicle. Such a source of disturbance is the vibratory behavior of the steering system, which in the speed range from 80 to 130 km/h is perceived by the driver of the vehicle as torsional vibration and vertical vibration of the steering wheel. The torsional vibration of the steering wheel is due to static and dynamic unbalances of the road wheels and to a vibration of the steering wheel about its axis and may be opposed by the use of a steering wheel having a large moment of inertia, i.e., a strong flywheel effect. On the other hand, a steering wheel having a small mass will be desirable to eliminate the vertical vibration of the steering wheel, which is due to the unbalance of the wheels of the rear axle. Owing to the complex vibratory behavior of the steering system the manufacturer of the steering wheel must find a compromise between a large moment of inertia, on the one hand, and a small mass, on the other hand, of the steering wheel and the required compromise may depend on the vehicle. In particular, a variation of the moment of inertia in combination with a minimized mass of the steering wheel is desirable. But the compromise must not decrease the safety of operation and the safety in case of an accident.

A steering wheel skeleton in which said compromise has been adopted has been described in DE-37 17 002 A. In that steering wheel skeleton the hub and the spokes of the steering wheel and the cast material which surrounds the spokes of the steering wheel at the aim thereof have integrally been made by pressure die-casting from an aluminum alloy and the rim of the steering wheel consists of a metallic material. For a steering wheel having given dimensions the pressure diecasting having an optimum weight consists of an aluminum alloy of type AlSi7Mg, AlSi9Mg or AlSi10Mg, which has been modified by an addition of antimony or strontium and has been heat-treated under a vacuum after having been cast and in dependence on the desired moment of inertia the rim of the steering wheel consists of a solid or tubular rim made of steel or aluminum or an aluminum alloy. The spokes of the steering wheel are designed as beams of uniform bending strength and are channel-shaped and open toward the steering column. A sufficiently large elongation at fracture is obtained by a heat treatment at 475° to 530° C. for 0.5 to 4 hours followed by a quenching and by a tempering at temperatures of 100° to 200° C. for 2 to 7 hours.

But the need for such heat treatment, which involves a special expenditure, can be eliminated without an adverse effect on the properties of mechanical technology which are most important for the safety in operation and in case of accidents, such as dimensional stability under static stress, fatigue limit under changing stress, and sufficiently high elongation at fracture in conjunction with an adequate resistance to deformation under the conditions of an accident, if in accordance with DE 38 27 794 A the pressure-diecast steering wheel skeleton consists of an aluminum alloy which contains 1.5 to less than 2.5% by weight magnesium and which optionally contains 0.4 to 0.6% by weight manganese; 0.4 to 1% by weight iron and 0.2 to 0.4% by weight silicon. The magnesium content should not exceed 2.5% by weight because a higher content would reduce the elongation at fracture. But as a low magnesium content will decrease the strength values the magnesium content should not be less than 1.5% by weight.

SUMMARY OF THE INVENTION

The demand of the manufacturers of motor vehicles for an optimum compromise between a sufficiently large elongation at fracture in conjunction with high strength values has led to a pressure-diecast steering wheel skeleton which is made of an aluminum alloy of the type AlMg and which in accordance with the invention is composed of

| | |
|---|---|
| 2.5 to 3.5 | % by weight magnesium |
| 0.10 to 0.30 | % by weight silicon |
| 0.40 to 0.60 | % by weight iron |
| 0.25 to 0.45 | % by weight manganese |
| 0.015 to 0.05 | % by weight copper |
| 0.035 to 0.085 | % by weight zinc |
| balance | aluminum. |

PREFERRED EMBODIMENT

The steering wheel skeleton preferably consists of a pressure-diecast aluminum alloy which contains

| | |
|---|---|
| 2.60% | by weight magnesium |
| 0.20% | by weight silicon |
| 0.40% | by weight iron |
| 0.35% | by weight manganese |
| 0.03% | by weight copper |
| 0.06% | by weight zinc |
| balance | aluminum. |

In a special embodiment of the invention the hub, the spokes and the rim of the steering wheel have been integrally made by pressure die-casting. Besides, the steering wheel skeleton is designed to constitute a structural element which will under-go a uniform deformation in case of a crash loading.

DRAWINGS

The steering wheel skeleton in accordance with the invention will be explained more in detail and by way of example with reference to the accompanying drawings, wherein.

Figure 1:
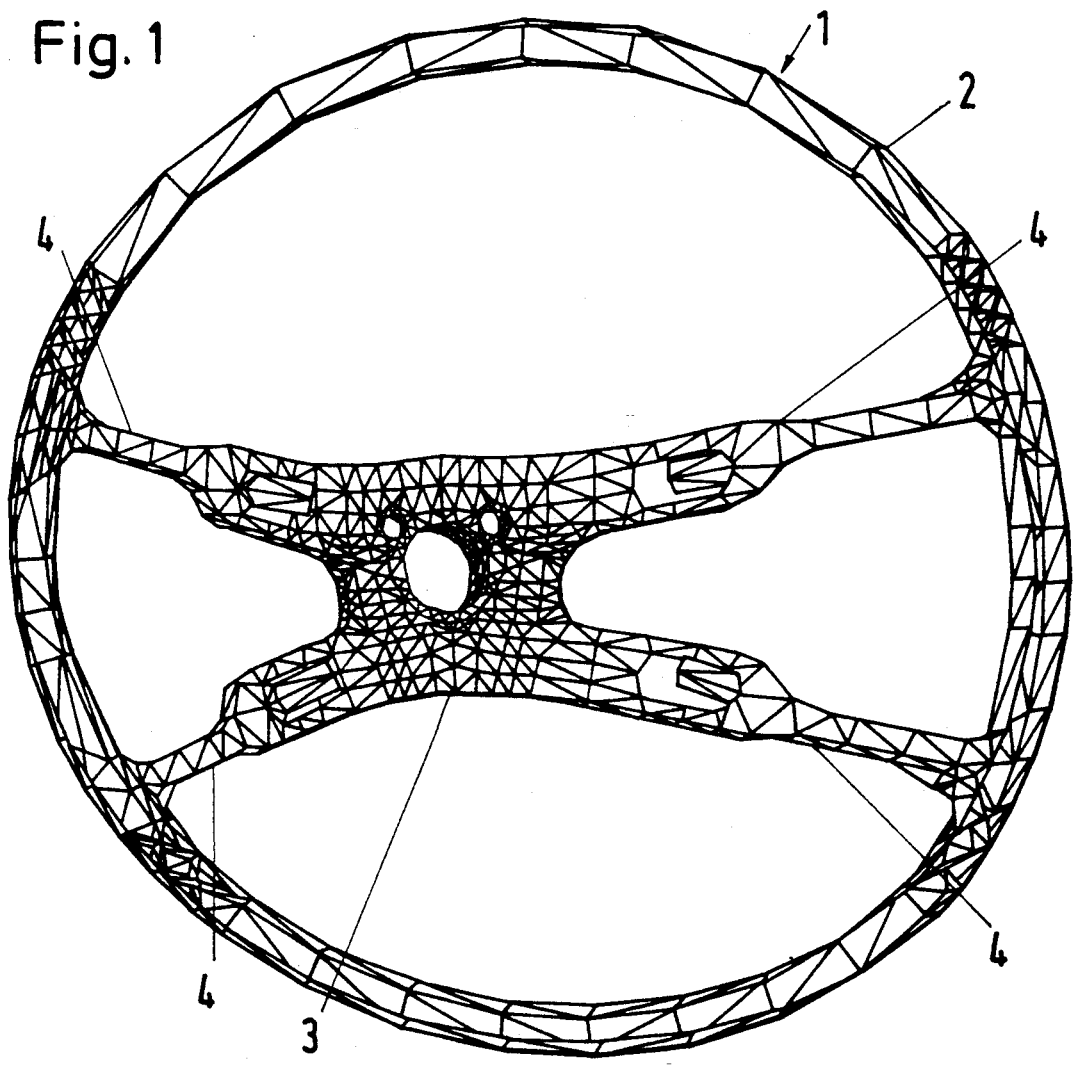
FIG. 1 is a plan view of a steering wheel skeleton in accordance with the invention.

Referring now more particularly to the drawings, the steering wheel skeleton which is shown in FIG. 1 has been designed in accordance with the finite-element method and has three-dimensionally curved shell elements (826-node/1446 element) and constitutes as a structural member which will undergo a uniform deformation under a crash loading. It has been made by a conventional pressure diecasting process from the aluminum-magnesium alloy composed of

| | |
|---|---|
| 2.60% | by weight magnesium |
| 0.20% | by weight silicon |
| 0.40% | by weight iron |
| 0.35% | by weight manganese |
| 0.03% | by weight copper |
| 0.06% | by weight zinc |
| balance | aluminum | and in such a manner that the hub 3 of the steering wheel is recessed from the rim 2 of the steering wheel and said hub 3, the four spokes 4 of the steering wheel and the rim 2 of the steering wheel are integrally joined. Thereafter the steering wheel skeleton 1 was subjected to a fatigue test, in which a force of 2000 N was exerted at the center of the top segment of the rim 2 of the steering wheel at right angles thereto. Because the steering wheel skeleton 1 in accordance with the pre-given specification has resisted more that 100,000 load cycles, it had the fatigue strength which is required by the manufacturers of motor vehicles.

To determine the fractureless elongation obtained in combination with a peak resistance to deformation not in excess of 11,111 N, an anthropometric doll was shot at a velocity of 24.1±1.2 km/h against the steering wheel skeleton, which had been mounted in a conventional position for use. The points of impact were disposed at the vertical centers of the small and large segments of the rim 2 of the steering wheel and on the portion of the rim of the steering wheel over one side of a spoke of the steering wheel. That steering wheel skeleton 1 can be regarded as having an optimum potential for deformation because the rim 2, the spokes 4 and the hub 3 of the steering wheel extended almost in a plane after the impact.

Figure 2:
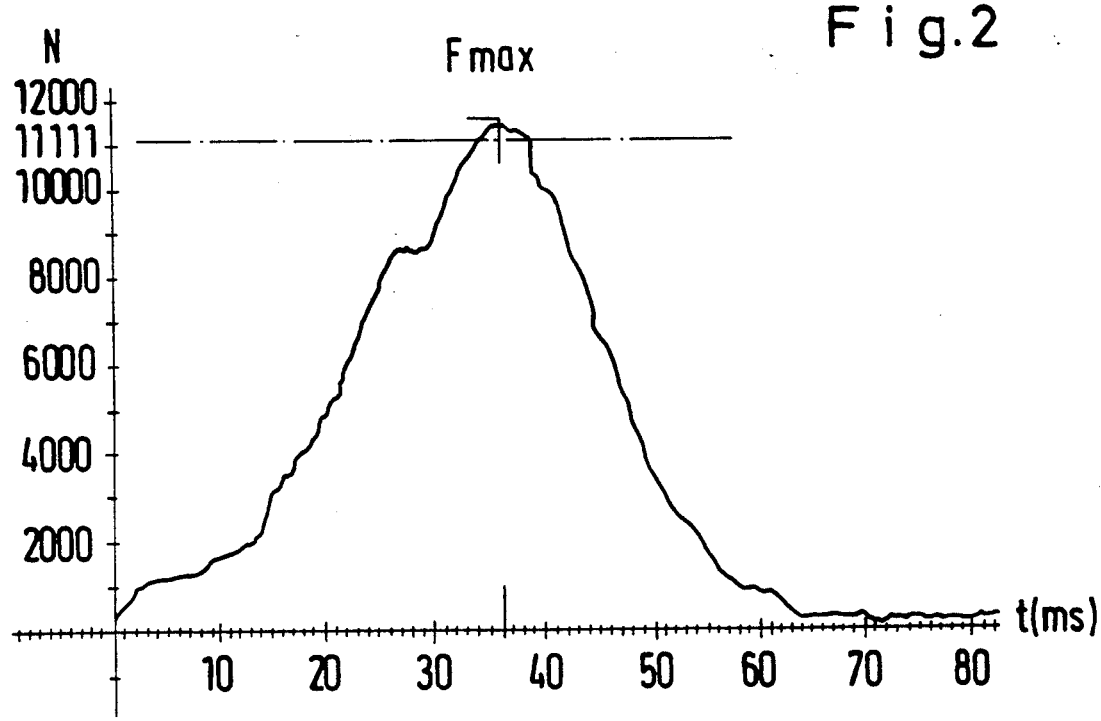
FIG. 2 is a plot of deformation against time of one steering wheel skeleton in accordance with the invention.
Figure 3:
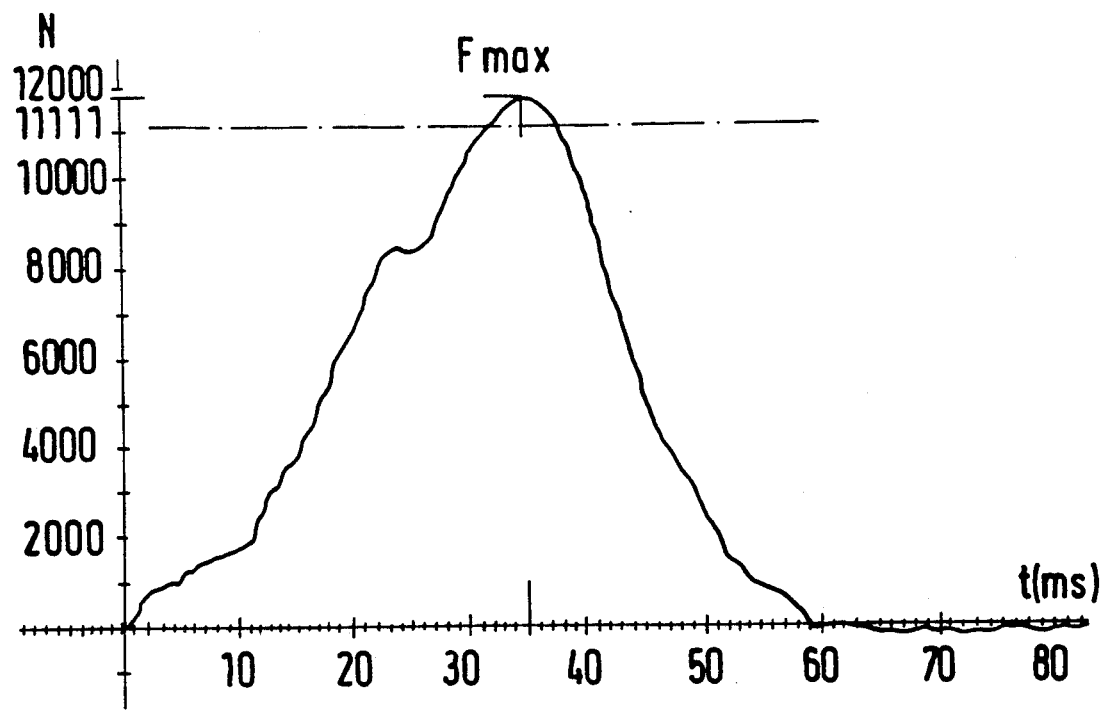
FIG. 3 is a plot of deformation against time for a heat-treated steering wheel skeleton in accordance with the invention.

In FIG. 2 the change of the resistance of the steering wheel skeleton to deformation under an impact loading of the spoke 4 of the steering wheel is plotted against time. Erratic load decreases, which would suggest fractures in the steering wheel, are not apparent. Such a behavior has previously been observed only in heat-treated steering wheel skeletons. In the curve shown in FIG. 3 the resistance to deformation is plotted against time for one hour for a steering wheel skeleton which had been heat-treated at 510° C. The two curves are almost identical. This proves that skeletons are proposed by the invention accomplish the object because they meet the requirements set forth also in an as-cast state. In both cases the peak resistance to deformation ($F_{max}$) exceeds the specified value of 11,111 N. When the steering wheel skeleton is covered with polyurethane foam, the peak resistance to deformation is distinctly below the permissible value ob 11,111 N.

Figure 4:
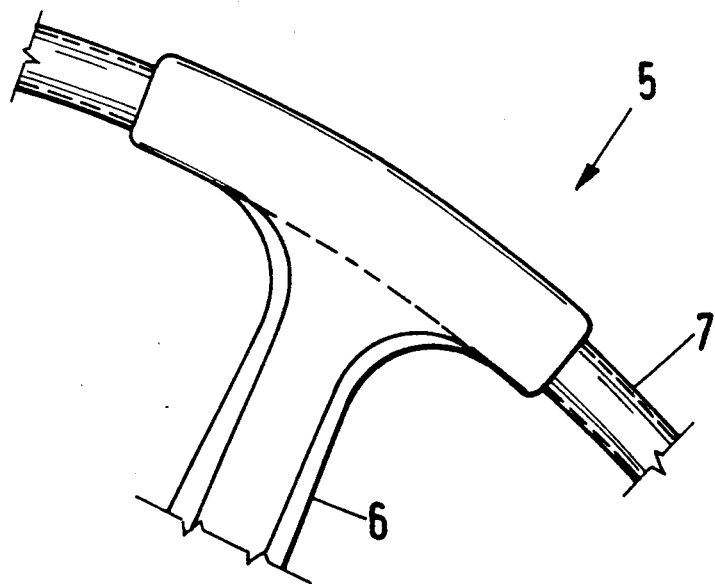
FIG. 4 is a fragmentary view of a steering wheel including a skeleton in accordance with the invention.

FIG. 4 is a fragmentary view showing a portion of a steering wheel skeleton 5 in which the hub, not shown, of the steering wheel and the spokes 6 of the steering wheel consist of an integral pressure diecasting and the rim 7 of the steering wheel consists of aluminum tubing and is surrounded by the cast spokes 6 of the steering wheel.

I claim:

1. A steering wheel skeleton including a hub, spokes and a rim, the hub and the spokes of the steering wheel having been made integrally by pressure diecasting from an AlMg alloy comprising by weight

| | |
|---|---|
| 2.5 to 3.5% | magnesium |
| 0.10 to 0.30% | silicon |
| 0.40 to 0.60% | iron |
| 0.25 to 0.45% | manganese |
| 0.015 to 0.05% | copper |
| 0.035 to 0.085% | zinc |
| balance | aluminum. |

2. A steering wheel skeleton according to claim 1, wherein the alloy comprises by weight

| | |
|---|---|
| 2.60% | magnesium |
| 0.20% | silicon |
| 0.40% | iron |
| 0.35% | manganese |
| 0.03% | copper |
| 0.06% | zinc |
| balance | aluminum. |

3. A steering wheel skeleton according to claim 1, wherein the hub (3), the spokes (4) and the rim (2) of the steering wheel consist of an integral casting.

4. A steering wheel skeleton according to claim 1, wherein the skeleton is a structural element which will undergo a uniform deformation under a crash loading.

5. A steering wheel comprising a steering wheel skeleton according to claim 1 and a covering.

6. A steering wheel according to claim 5, wherein the covering is polyurethane foam.